US011070588B2

(12) United States Patent
Ludwig et al.

(10) Patent No.: US 11,070,588 B2
(45) Date of Patent: Jul. 20, 2021

(54) COGNITIVE MALICIOUS ACTIVITY IDENTIFICATION AND HANDLING

(71) Applicant: International Business Machines Corporation, Armonk, NY (US)

(72) Inventors: Markus Ludwig, Breuna (DE); Johannes Noll, Kassel (DE); Marc Noske, Kassel (DE); Matthias Seul, San Francisco, CA (US); Volker Vogeley, Sooden-Allendorf (DE)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/005,054

(22) Filed: Jun. 11, 2018

(65) Prior Publication Data
US 2019/0379696 A1 Dec. 12, 2019

(51) Int. Cl.
*H04L 29/06* (2006.01)
*H04L 12/24* (2006.01)

(52) U.S. Cl.
CPC ...... *H04L 63/1491* (2013.01); *H04L 41/0816* (2013.01); *H04L 63/1416* (2013.01); *H04L 63/1425* (2013.01); *H04L 63/1433* (2013.01); *H04L 63/20* (2013.01); *H04L 63/302* (2013.01)

(58) Field of Classification Search
None
See application file for complete search history.

(56) References Cited

U.S. PATENT DOCUMENTS

| | | | |
|---|---|---|---|
| 7,681,235 B2 * | 3/2010 | Chesla | G06F 21/552 |
| | | | 726/22 |
| 8,555,388 B1 | 10/2013 | Wang et al. | |
| 8,677,495 B1 | 3/2014 | Yang et al. | |
| 8,682,812 B1 | 3/2014 | Ranjan | |
| 9,143,522 B2 | 9/2015 | Wang et al. | |
| 9,560,075 B2 | 1/2017 | Goldberg et al. | |
| 9,635,039 B1 | 4/2017 | Islam et al. | |
| 10,298,598 B1 * | 5/2019 | McClintock | H04L 63/1425 |
| 2009/0049550 A1 | 2/2009 | Shevchenko | |

(Continued)

FOREIGN PATENT DOCUMENTS

WO    WO02013/113532 A1    8/2013

*Primary Examiner* — Kambiz Zand
*Assistant Examiner* — Arezoo Sherkat
(74) *Attorney, Agent, or Firm* — Francis Lammes; Stephen J. Walder, Jr.; Jeffrey S. LaBaw

(57) ABSTRACT

Mechanisms are provided to implement a malicious activity response system (MARS) that automatically identifies and handles malicious activities within the data processing system. The MARS identifies threat intelligence associated with characteristics of malicious activity. The MARS forms a hypothesis for the malicious attack to identify a malicious attack that is occurring. The MARS identifies a trap for use in isolating the malicious activity; deploys the trap and automatically reconfiguring a network associated with the data processing system such that the malicious activity is routed to the trap thereby isolating the malicious activity, observes a behavior of the malicious activity within the trap; and extracts features associated with the malicious activity in the trap. The MARS then utilizes the extracted features to improve an operation of the malicious activity response system in handling future malicious activity.

17 Claims, 4 Drawing Sheets

(56) References Cited

U.S. PATENT DOCUMENTS

| | | |
|---|---|---|
| 2012/0204264 A1 | 8/2012 | Jiang et al. |
| 2012/0255000 A1 | 10/2012 | Sallam |
| 2014/0090059 A1 | 3/2014 | Wang et al. |
| 2016/0156644 A1 | 6/2016 | Wang et al. |
| 2017/0142144 A1* | 5/2017 | Weinberger ......... H04L 63/0263 |
| 2017/0223046 A1* | 8/2017 | Singh ................... H04L 43/062 |
| 2018/0198806 A1* | 7/2018 | Gopalakrishna .... H04L 63/1491 |
| 2018/0316708 A1* | 11/2018 | Strong .................... H04L 63/14 |
| 2019/0207966 A1* | 7/2019 | Vashisht ............... G06F 16/285 |

* cited by examiner

COGNITIVE MALICIOUS ACTIVITY IDENTIFICATION AND HANDLING

BACKGROUND

The present application relates generally to an improved data processing apparatus and method and more specifically to mechanisms for automatically identifying and handling malicious activities within a data processing system utilizing cognitive and anomaly detection mechanisms.

An Internet Bot, also known as web robot, WWW robot, or simply bot, is a software application that runs automated tasks (scripts) over the Internet. Typically, bots perform tasks that are both simple and structurally repetitive, at a much higher rate than would be possible for a human alone. The largest use of bots is in web spidering (web crawler), in which an automated script fetches, analyzes, and files information from web servers at many times the speed of a human.

Thus, a botnet, which is a word that combines the words "robot" and "network," is a number of Internet-connected devices, each of which is running one or more bots. Botnets may be used to perform malicious activities such as distributed denial-of-service attack (DDoS attack), steal data, send spam, and allow an attacker to access the device and its connection. The owner of a botnet may control the botnet using command and control (C&C) software.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to cause the processor to be configured to implement a malicious activity response system that automatically identifies and handles malicious activities within the data processing system. The method comprises identifying threat intelligence associated with characteristics of the malicious activity. The method also comprises forming a hypothesis for the malicious attack to identify a malicious attack that is occurring. The method comprises identifying a trap for use in isolating the malicious activity, deploying the trap and automatically reconfiguring a network associated with the data processing system such that the malicious activity is routed to the trap thereby isolating the malicious activity; observing a behavior of the malicious activity within the trap; and extracting features associated with the malicious activity in the trap. The method further comprises utilizing the extracted features to improve an operation of the malicious activity response system in handling future malicious activity.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
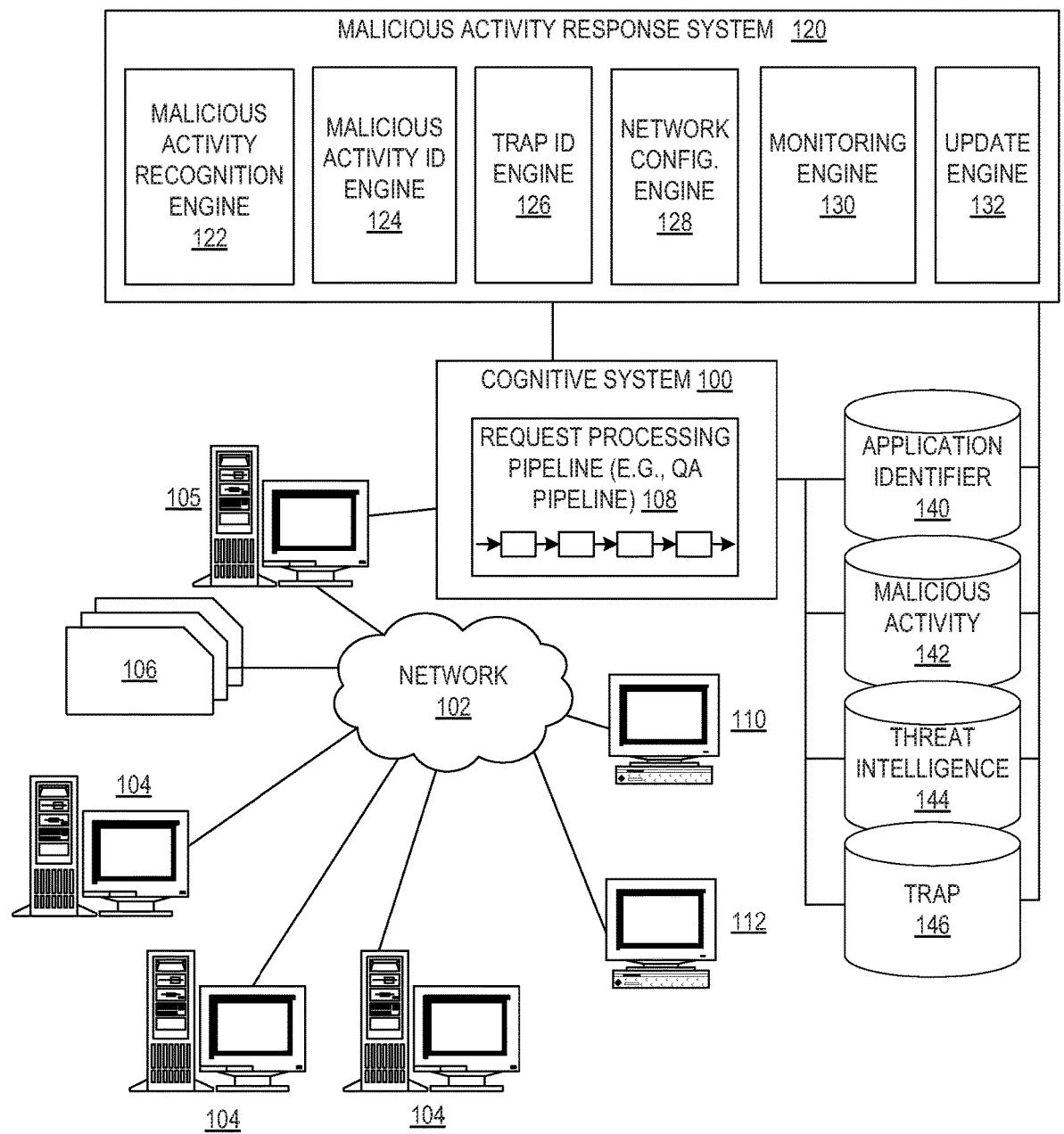
FIG. 1 depicts a schematic diagram of one illustrative embodiment of a cognitive system in a computer network.

The illustrative embodiments provide mechanisms for automatically identifying and handling malicious activities within a data processing system. As noted previously, a botnet is a number of Internet-connected devices, each of which is running one or more bots that may be used to perform malicious activities such as distributed denial-of-service attack (DDoS attack), steal data, send spam, and allow an attacker to access the device and its connection. Existing methods of identifying botnet related activities require resource intensive operations to find the botnet related activities, program a botnet specific trap which speaks a specific protocol of the botnet, and reconfigure a network to route the botnet related activities to this botnet specific trap. These operations are usually required to simulate a successful infection for the attacker and to allow deeper insights into IP addresses used for controlling the botnet, Uniform Resource Locators (URLs) from which additional malicious content is loaded, targets of further attacks, and other behavior.

However, these current operations require an identification of new botnet activity, writing of code for a compatible botnet trap, and manual configuration of a network before being able to gain deeper insights and harvest additional information with regard to the botnet. In most cases, identification and handling of new botnet activities takes from days to weeks until additional information about such activities are harvestable. This results in having the information available for protection measures, forensics, research activities, threat intelligence use cases, or the like, only when botnet activities have already stopped such that malware may have already spread and information with regard to the botnet activities may have lost most of its worth.

Thus, the illustrative embodiments provide mechanisms for automatically identifying and handling malicious activities within a data processing system using cognitive and anomaly detecting mechanisms. The mechanisms observe network activities and automatically configure a trap environment based on information like IP address, port information, protocols, or the like, identified using cognitive and anomaly detecting mechanisms as well as based on information gained from resources such as, for example, Watson for CyberSecurity, web or social media data, X-Force Threat intelligence information, or the like. The mechanisms route unknown and known malicious activities to multiple generic and specific malicious activity traps and compare the observed activities on each trap to identify the most attracting trap method based on the harvested data of each trap. The mechanism store all gather information in order to learn which identification methods, resources, traps, or the like are most effective. By automatically deploying generic and/or specific trap environments at substantially a same time that the malicious activities are identified the time required to gain insights into malicious activities is decreased from days and weeks to hours, minutes, or even seconds and allows for early protection and threat intelligence usage.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
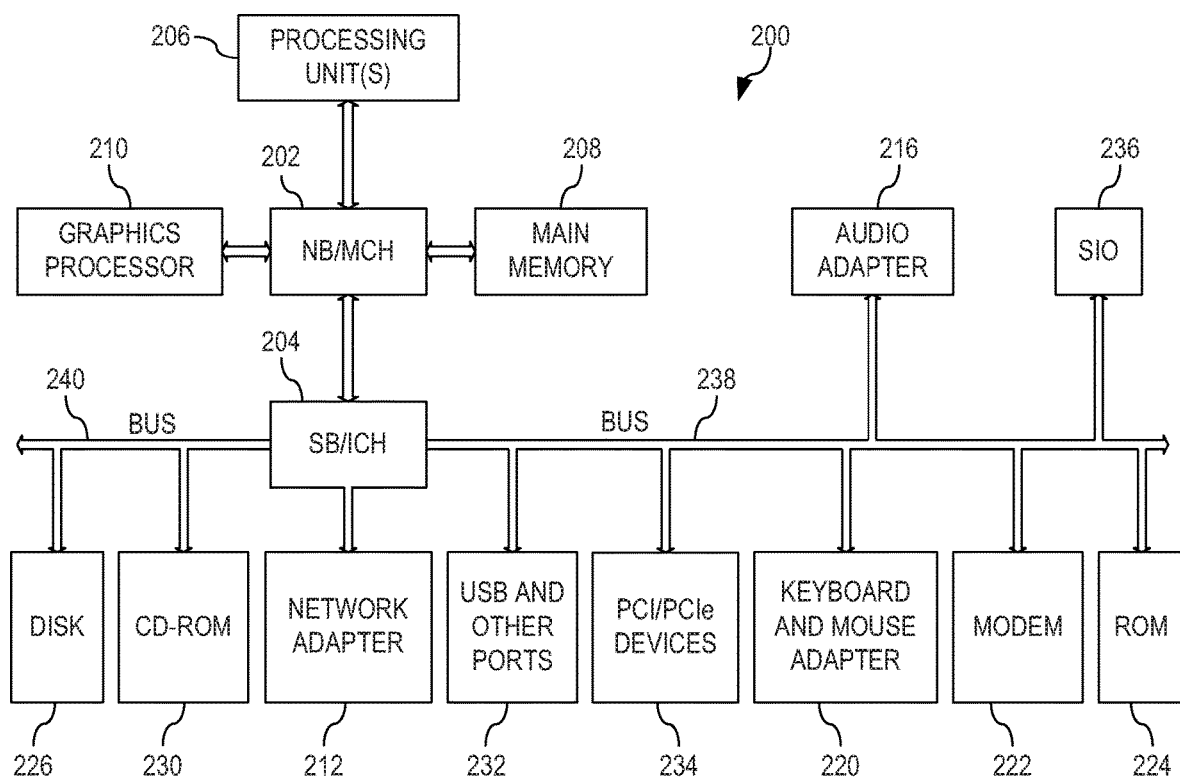
FIG. 2 is a block diagram of an example data processing system in which aspects of the illustrative embodiments are implemented.
Figure 3:
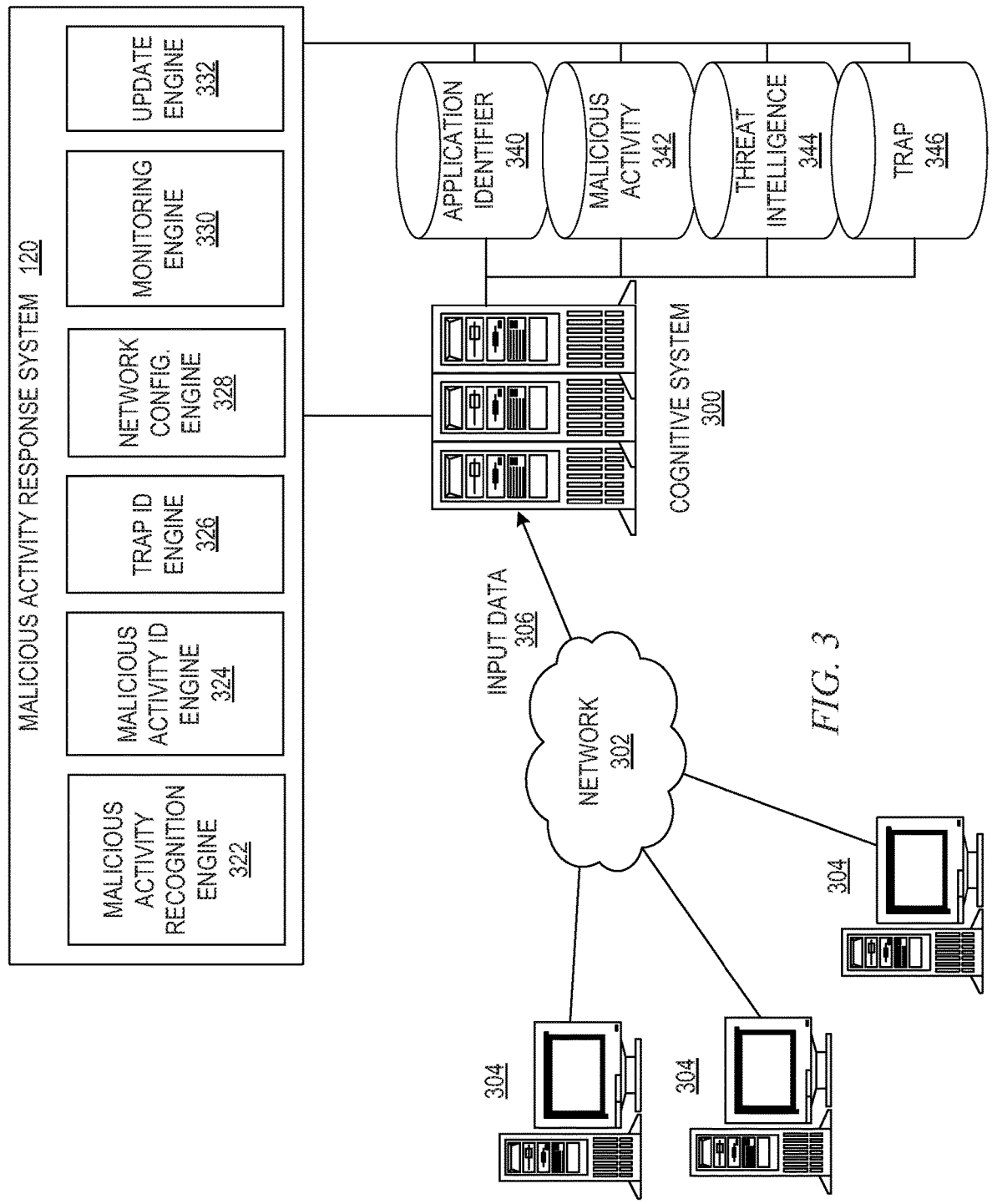
FIG. 3 is an example diagram illustrating an interaction of elements of a cognitive system in accordance with one illustrative embodiment.

As noted above, the present invention provides mechanisms for automatically identifying and handling malicious activities within a data processing system. Thus, the illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system for automatically identifying and handling malicious activities within a data processing system. As described in more detail hereafter, the particular application that is implemented in the cognitive system of the present invention is an application for identifying and handling malicious activities within a data processing system. It should be appreciated that the cognitive system, while shown as having a single processing pipeline in the examples hereafter, may in fact have multiple processing pipelines. Each processing pipeline may be separately trained and/or configured to process detected malicious activities or be configured to perform the same or different analysis on each detected malicious activity, depending on the desired implementation. For example, in some cases, a first processing pipeline may be trained to operate on a detected malicious activity directed to identifying IP address, port information, protocol, or the like associated with the malicious activity. In other cases, for example, a second processing pipeline may be configured to identify supporting information associated with the malicious activity from resources such as, for example, Watson for CyberSecurity, web or social media data, X-Force Threat intelligence information, or the like. In further cases, a third processing pipeline may be configured to identify an existing malicious activity trap or generic trap from a corpus of malicious activity traps based on the identified information associated with the malicious activities and the information gained from the analyzed resources. In still further cases, a fourth processing pipeline may be configured to automatically reconfigure a network of the data processing system to route the malicious activities to the selected malicious activity specific trap. In yet other cases, other processing pipelines may provide different types of cognitive functions or support different types of applications, such as one request processing pipeline being used for updating resources based on the information gained from processing the current malicious activity, updating the corpus of malicious activity traps if a new malicious activity trap is created, etc.

Moreover, each processing pipeline may have their own associated corpus or corpora that they ingest and operate on, e.g., one corpus for unstructured information associated with malicious activities (e.g. blogs, forum posts, social media, or the like), another corpus for tactical threat intelligence (e.g. IP reputation, known attacks, vulnerabilities, or the like), and yet another corpus for traps (e.g. malicious activity specific traps, generic malicious activity traps, or the like) in the above examples. In some cases, the processing pipelines may each operate on the same domain of information but may have different configurations, e.g., different annotators or differently trained annotators, such that different analysis and potential responses are generated. The cognitive system may provide additional logic for routing malicious activity to the appropriate request processing pipeline, such as based on a determined domain of the malicious activity, combining and evaluating final responses generated by the processing performed by multiple processing pipelines, and other control and interaction logic that facilitates the utilization of multiple processing pipelines.

As noted above, one type of processing pipeline with which the mechanisms of the illustrative embodiments may be utilized is a malicious activity response pipeline. The description of example embodiments of the present invention hereafter will utilize a malicious activity response pipeline as an example of a processing pipeline that may be augmented to include mechanisms in accordance with one or more illustrative embodiments. It should be appreciated that while the present invention will be described in the context of the cognitive system implementing one or more malicious activity response pipelines that operate on a specific set of malicious activity, the illustrative embodiments are not limited to such. Rather, the mechanisms of the illustrative embodiments may operate on many different types of malicious activities that are not malicious specific malicious activities but that the cognitive system may perform cognitive operations on.

Thus, it is important to first have an understanding of how cognitive systems and malicious activity response in a cognitive system implementing a malicious activity response pipeline is implemented before describing how the mechanisms of the illustrative embodiments are integrated in and augment such cognitive systems and processing pipeline mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems and the malicious activity response pipelines comprises within provide mechanisms for automatically identifying and handling malicious activities, which may include structures and unstructured data. The malicious activity response pipeline, as well as the cognitive system in which the malicious activity response pipeline is comprised, is an artificial intelligence application executing on data processing hardware that responds to detected malicious activities. The malicious activity response pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the malicious activity response pipeline. The document may include any file, text, article, or source of data for use in the malicious activity response system. For example, a malicious activity response pipeline accesses a body of knowledge about the domain, or subject matter area, e.g., malicious activity context, tactical threat intelligence, malicious activity traps, etc., where the body of knowledge (knowledgebase) may be organized in a variety of configurations, e.g., a structured repository of domain-specific information, such as ontologies, or unstructured data related to the domain, or a collection of natural language documents about the domain.

The cognitive system receives detected malicious activity and, in response, implements the malicious activity response pipeline. The malicious activity response pipeline then analyzes the malicious activity using the content in the corpus of data by evaluating documents, sections of documents, portions of data in the corpus, or the like. When a process evaluates a given section of a document for semantic content, the process can use a variety of conventions to query such document from the malicious activity response pipeline, e.g., sending the query to the malicious activity response pipeline as well-formed information that is then interpreted by the malicious activity response pipeline and a response is provided containing one or more responses, in the form of malicious activity traps, automatic network configurations, or the like, to handle the detected malicious activity. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the malicious activity response pipeline receives detected malicious activity, identifies what type of malicious activity has been detected, identifies a specific or generic malicious activity trap that is to be deployed to contain the malicious activity, automatically configures a network so that the malicious activity is routed to the selected malicious activity trap, and traps the malicious activity, such that behavior of the malicious activity may be monitored, features of the malicious activity may be extracted, effectiveness of the malicious activity trap may be monitored, malicious activity traps may be updates or new malicious activity traps may be created to handle future malicious activity, information may be created and relayed to other enterprises that may be subject to such malicious activity, or the like.

FIG. 1 depicts a schematic diagram of one illustrative embodiment of a cognitive system 100 implementing a processing pipeline 108, which in some embodiments may be a malicious activity response pipeline, in a computer network 102. For purposes of the present description, it will be assumed that the processing pipeline 108 is implemented as a malicious activity response pipeline 108 that operates on structured and/or unstructured information. The cognitive system 100 is implemented on one or more computing devices 104 (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing devices 104 only, but as noted above the cognitive system 100 may be distributed across multiple computing devices, such as a plurality of computing devices 104. The network 102 includes multiple computing devices 104, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables malicious activity response functionality for one or more cognitive system users via their respective computing devices 110-112. In other embodiments, the cognitive system 100 and network 102 may provide other types of cognitive operations including, but not limited to, processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement malicious activity response pipeline 108 that receive inputs from various sources. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104 on the network 102 include access points for content creators and cognitive system users. Some of the computing devices 104 include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content, such as information associated with malicious activities (e.g. blogs, forum posts, social media, or the like), tactical threat intelligence (e.g. IP reputation, known attacks, vulnerabilities, or the like), and traps (e.g. malicious activity specific traps, generic malicious activity traps, or the like) within a corpus or corpora of data 106 for use as part of a corpus of data with the cognitive system 100. The cognitive system 100 operates via a network connection or an Internet connection to the network 102 to automatically identifying and handling malicious activities within a data processing system. The cognitive system 100 implements the malicious activity response pipeline 108 which comprises a plurality of stages for processing malicious activities based on information obtained from the corpus or corpora of data 106. The malicious activity response pipeline 108 generates responses for handling the malicious activity based on the processing of the malicious activity and information obtained from the corpus or corpora of data 106. The malicious activity response pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a malicious activity response pipeline of the IBM Watson™ cognitive system receives an indication of detected malicious activity which it then processes to identify a connection used by the malicious activities, an IP address of the malicious activity, an IP protocol of the malicious activity, or the like, which in turn are then used to formulate queries that are applied to the corpus or corpora of data 106. Based on the application of the queries to the corpus or corpora of data 106, the cognitive system 100 identifies patterns, vulnerabilities, threats, or the like, associated with the malicious activity, which may then be used to identify what type of malicious activity has been detected, identify a specific or generic malicious activity trap that is to be deployed to contain the malicious activity, automatically configure a network so that the malicious activity is routed to the selected malicious activity trap, and trap the malicious activity. The malicious activity response pipeline 108 of the IBM Watson™ cognitive system may then performs deep analysis on the gained information such that behavior of the malicious activity may be monitored, features of the malicious activity may be extracted, effectiveness of the malicious activity trap may be monitored, malicious activity traps may be updates or new malicious activity traps may be created to handle future malicious activity, information may be created and relayed to other enterprises that may be subject to such malicious activity, or the like, which may include updating portions of the corpus 106.

As noted above, while the input to the cognitive system 100 may be in the form of detected malicious activity; however, the illustrative embodiments are not limited to such. Rather, the input may in fact be formatted or structured as any suitable type of input which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. In the case of a malicious activity, this analysis may involve processing generated malicious activity in order to improve the response to future detected malicious activity.

In the context of the present invention, cognitive system 100 may provide a cognitive functionality for automatically identifying and handling malicious activities within a data processing system. For example, depending upon the particular implementation, the automated learning based operations that may comprise malicious activity responses, such as identifying a type of malicious activity that has been detected, identifying a specific or generic malicious activity trap that is to be deployed to contain the malicious activity, automatically configuring a network so that the malicious activity is routed to the selected malicious activity trap, and trapping the malicious activity. Thus, the cognitive system 100 may be a malicious activity response cognitive system 100 that operates in security type domains and which may process malicious activity for such security operations via the malicious activity response processing pipeline 108 as either structured operations, unstructured operations, or the like. In one illustrative embodiment, the cognitive system 100 is a malicious activity response cognitive system that automatically identifies and handles detected malicious activities within a data processing system.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing malicious activity response system 120 that automatically identifying and handling malicious activities within a data processing system. As shown in FIG. 1, malicious activity response system 120 comprises malicious activity recognition engine 122, malicious activity identification engine 124, trap identification engine 126, network configuration engine 128, monitoring engine 130, and update engine 132.

In one embodiment, in cognitive system 100 and, more specifically, in malicious activity response system 120, malicious activity recognition engine 122 observes incoming network activities via network 102 for accesses that utilize, for example, unused port, new patterns of data, data patterns matching or similar to previously encountered malicious attacks, or the like. With regard to the unused ports, malicious activity recognition engine 122 is aware of both incoming and outgoing ports that are assigned to be used by cognitive system 100 thus, if a previously unused ports suddenly becomes active without malicious activity recognition engine 122 being notified, malicious activity recognition engine 122 identifies data coming through that unused port as possible malicious activity. With regard to new patterns of data, malicious activity recognition engine 122 is aware of a type of data, i.e. patterns, protocols, or the like, that is being received and sent over the incoming and outgoing ports. Therefore, if a new pattern of data is suddenly received or sent over a port without malicious activity recognition engine 122 being notified, malicious activity recognition engine 122 identifies that data as possible malicious activity. With regard to data patterns matching or similar to previously encountered malicious attacks, malicious activity recognition engine 122 compares incoming data to that of previously encountered malicious attacks. If malicious activity recognition engine 122 identifies an incoming or outgoing data pattern that matches of is similar to a previously encountered malicious attacks, malicious activity recognition engine 122 identifies data coming through that unused port as possible malicious activity.

Once malicious activity recognition engine 122 has identified possible malicious activity, malicious activity identification engine 124 operates to identify the specific malicious activity. Initially, malicious activity identification engine 124 identifies the internet protocol (IP) of the malicious activity as well as a port that the malicious activity is utilizing. Most application, even malicious attack applications, utilize a common port when attempting to infiltrate a data processing system. Therefore, malicious activity identification engine 124 utilized the identified IP and port to search application identifier corpus 140 for known malicious activity applications that utilize a same IP and port. Application identifier corpus 140 is a knowledgebase that comprises IP and port information associated with numerous applications both non-malicious and malicious. Application identifier corpus 140 is updated by computer professionals so that other computer professionals may be aware an IP and port that applications utilize. Malicious activity identification engine 124 then searches malicious activity corpus 142 for "hot" attacks that are utilizing a same IP, port, and/or application. "Hot" attacks are attacks that are currently being experienced or have recently been experienced by corporations, enterprises, businesses, customers, or the like, and are being reported by security professionals. Malicious activity corpus 142 may include a knowledgebase that is updated by security professionals so that other security professionals may be aware of those malicious attacks that are currently being experienced or have recently been experienced in order that other security professionals may benefit from the information. Malicious activity corpus 142 may also include blogs, forum posts, social media, or the like, that is posted on social media concerning malicious attacks that are currently being experienced or have recently been experienced.

Malicious activity identification engine 124 then searches threat corpus 144 for threat intelligence associated with a same IP, port, application, and/or "hot" attack. Threat intelligence corpus 144 is a knowledgebase that is updated by security professionals so that other security professionals may be aware of intelligence associated with threats that are currently being experienced or have recently been experienced in order that other security professionals may benefit from the information, such as IP reputation, known attacks, vulnerabilities, or the like. Utilizing the gathered intelligence, i.e. the IP, port, application, "hot" attack, threat intelligence, or the like, intelligence, malicious activity identification engine 124 forms hypotheses for the incoming malicious attack, such as an application that is being targeted, an IP that is being used, a vulnerability that is being exploited, or the like. Utilizing the gathered information and the formed hypotheses, malicious activity identification engine 124 may identify one or more malicious attacks that are occurring.

For each malicious attack of the one or more malicious attacks, trap identification engine 126 searches trap corpus 146 for a malicious activity trap that matches the characteristics of the malicious attack. A malicious activity trap provides a secure computing area where the malicious activity may operate without harming the data processing system and be observed as discussed hereafter. That is, each trap in trap corpus 146 is catalogued by port, internet protocol, product emulated, vulnerabilities emulated, malicious attack name, application attacked, or the like. Thus, utilizing the characteristics of the incoming malicious attack, i.e. the IP, port, application, "hot" attack, threat intelligence, hypotheses, or the like, trap identification engine 126 identifies a trap for use in isolating the incoming malicious activity. It should be noted that not every malicious attack may have an explicit trap to isolate the malicious activity. Thus, trap identification engine 126 matches as many characteristics as possible and selects a trap with a highest amount of matching characteristic. If trap identification engine 126 is unable to match any characteristics, trap identification engine 126 may select a generic trap for using in isolating or at least slowing down the malicious activity. If trap identification engine 126 selects a generic trap since no explicit trap is identifiable, trap identification engine 126 sends a report to the security professionals so that the security professionals may build a new trap based on information gathered by monitoring engine 130 as will be discussed hereafter.

Whether or not an explicit trap or generic trap is selected for each detected malicious attack, network configuration engine 128 deploys the trap and automatically reconfigures the network such that the malicious activity is routed to the trap thereby isolating the malicious activity. Network configuration engine 128 deploys the trap and reconfigures the network based on a set of routing rules, such as routing rules, firewall rules, or the like. The set of routing rules is predefined such that, based on the trap selected by trap identification engine 126, network configuration engine 128 knows what network changes to implement, i.e. switches, routing, or the like, so that the malicious activity is routed to the isolated area. Similarly, if more than one of the one or more malicious attacks is being received over a common port, network configuration engine 128 spreads the traffic across all of the traps that are selected for that port utilizing sets of rules associated with each of the selected traps. The set of routing rules may also identify what type of monitoring is to be performed by monitoring engine 130, such that, when the malicious activity is routed to the isolated area, monitoring engine 130 observes the behavior of the malicious activity within each trap according to the set of routing rules.

Specifically, monitoring engine 130 observes the effectiveness of the trap in isolating the malicious activity and extracts features, such as a duration of a communication, an amount of transferred data, commands issued from the malicious activity, utilized communication details including IP addresses, sockets, ports, or the like, download web site addresses, test alive web pages, additionally downloaded code, malicious code files, additionally downloaded programs, or the like, for improving current traps or building new traps. That is, once the features of the isolation of the malicious activity are observed and gathered, update engine 132 stores the features as an update to threat intelligence corpus 144. Update engine 132 also utilizes the features to, automatically or in consultation with a security professional, improve one or more existing traps or build one or more new traps in trap corpus 146. That is, for each of the selected traps, update engine 132 utilizes the stored features to identify an effectiveness of the selected trap. When measuring the effectiveness, the determination may be that the selected trap needs minor changes or that the selected trap was not effective. Thus, for example, if the measured effectiveness of trap A is such that the trap A was ineffective, it does not make sense to make changes to the trap A but rather, update engine 132 marks, in the set of routing rules, that trap A was ineffective for malicious activity X and should not be used for malicious activity X in the future. However, since one or more traps may be selected, then if traps A, B, C, and D were selected for malicious activity X and trap A was marked as ineffective, but analysis of the features indicate that traps B, C, and D were effective, then update engine 132 may make changes traps B, C, and D as to be used for malicious activity X a next time malicious activity X comes in, i.e. the rule set will say "Route to trap B, C, and/or D". Determining whether a trap is effective may include, but is not limited to, connection abort or successful connection; duration of a successful connection (i.e. not aborted, no time out, packets flowing in and out); extracted number of IP addresses, URLs, files, commands, or the like; or any other countable measure that may be used to measure an effectiveness from activity to activity and trap to trap. A trap that encompasses characteristics associated with the most extracted features is considered a most effective trap for a particular malicious activity.

While the previous embodiment operates in reaction to detected incoming malicious activity, malicious activity response system 120 may also operate in a proactive manner. That is, in another illustrative embodiment, malicious activity identification engine 124 searches malicious activity corpus 142 for "hot" attacks that are currently being experienced by other corporations, enterprises, businesses, customers, or the like, and are being reported by security professionals even though cognitive system 100 is not experiencing current malicious attack. Again, malicious activity corpus 142 may include a knowledgebase that is updated by security professionals so that other security professionals may be aware of those malicious attacks that are currently being experienced or have recently been experienced in order that other security professionals may benefit from the information as well as blogs, forum posts, social media, or the like, that is posted on social media concerning malicious attacks that are currently being experienced or have recently been experienced.

Responsive to one or more "hot" attacks being identified, malicious activity identification engine 124 searches threat corpus 144 for threat intelligence associated with a same IP, port, and application associated with the identified one or more "hot" attacks. Again, threat intelligence corpus 144 is a knowledgebase that is updated by security professionals so that other security professionals may be aware of intelligence associated with threats that are currently being experienced or have recently been experienced in order that other security professionals may benefit from the information such as IP reputation, known attacks, vulnerabilities, or the like. Malicious activity identification engine 124 then forms hypotheses for the incoming malicious attack, such as an application that is being targeted, an IP that is being used, a vulnerability that is being exploited, or the like. Utilizing the gathered information and the formed hypotheses, malicious activity identification engine 124 may identify one or more malicious attacks that are occurring.

For each malicious attack of the one or more malicious attacks, trap identification engine 126 searches trap corpus 146 for a malicious activity trap that matches the characteristics of the malicious attack. A malicious activity trap provides a secure computing area where the malicious activity may operate without harming the data processing system and be observed as discussed hereafter. That is, each trap in trap corpus 146 is catalogued by port, internet protocol, product emulated, vulnerabilities emulated, malicious attack name, application attacked, or the like. Thus, utilizing the characteristics of the incoming malicious attack, i.e. the IP, port, application, "hot" attack, threat intelligence, hypotheses, or the like, trap identification engine 126 identifies a trap for use in isolating possible malicious activity. Network configuration engine 128 then deploys the trap and automatically reconfigures the network in preparations for possible incoming malicious activity. Network configuration engine 128 deploys the trap and reconfigures the network based on a set of routing rules, such as routing rules, firewall rules, or the like. The set of routing rules is predefined such that, based on the trap selected by trap identification engine 126, network configuration engine 128 knows what network changes to implement, i.e. switches, routing, or the like, so that the malicious activity is routed to the isolated area. Similarly, if malicious activity is then detected and identified as malicious activity as associated with one or the one or more identified "hot" attacks, network configuration engine 128 routes the malicious activity to the already deployed trap and the operation proceeds as discussed previously.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and botnet activity response pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is an example diagram illustrating an interaction of elements of a cognitive system in accordance with one illustrative embodiment. The example diagram of FIG. 3 depicts an implementation of a cognitive system 300, which may be a cognitive system such as cognitive system 100 described in FIG. 1, that is configured to implement automatically identifying and handling of malicious activities within a data processing system, such as cognitive system 100. However, it should be appreciated that this is only an example implementation and other malicious activity identification and handling operations may be implemented in other embodiments of the cognitive system 100 without departing from the spirit and scope of the present invention.

As is shown in FIG. 3, cognitive system 300 receives input data 306 from one or more computing device 304 via a network 302. In accordance with the illustrative embodiments herein, cognitive system 300 is augmented to include cognitive system 320. Cognitive system 320 comprises malicious activity recognition engine 322, malicious activity identification engine 324, trap identification engine 326, network configuration engine 328, monitoring engine 330, and update engine 332, which operate in a similar manner as previously described above with regard to corresponding elements 122-132 in FIG. 1. Malicious activity recognition engine 322 observes incoming network activities in input data 306 for accesses that utilize, for example, unused port, new patterns of data, data patterns matching or similar to previously encountered malicious attacks, or the like. With regard to the unused ports, malicious activity recognition engine 322 is aware of both incoming and outgoing ports that are assigned to be used by cognitive system 300 thus, if a previously unused ports suddenly becomes active without malicious activity recognition engine 322 being notified, malicious activity recognition engine 322 identifies data coming through that unused port as possible malicious activity. With regard to new patterns of data, malicious activity recognition engine 322 is aware of a type of data, i.e. patterns, protocols, or the like, that is being received and sent over the incoming and outgoing ports. Therefore, if a new pattern of data is suddenly received or sent over a port without malicious activity recognition engine 322 being notified, malicious activity recognition engine 322 identifies that data as possible malicious activity. With regard to data patterns matching or similar to previously encountered malicious attacks, malicious activity recognition engine 322 compares incoming data to that of previously encountered malicious attacks. If malicious activity recognition engine 322 identifies an incoming or outgoing data pattern that matches of is similar to a previously encountered malicious attacks, malicious activity recognition engine 322 identifies data coming through that unused port as possible malicious activity.

Once malicious activity recognition engine 322 has identified possible malicious activity, malicious activity identification engine 324 operates to identify the specific malicious activity. Initially, malicious activity identification engine 324 identifies the internet protocol (IP) of the malicious activity as well as a port that the malicious activity is utilizing. Most application, even malicious attack applications, utilize a common port when attempting to infiltrate a data processing system. Therefore, malicious activity identification engine 324 utilized the identified IP and port to search application identifier corpus 340 for known malicious activity applications that utilize a same IP and port. Application identifier corpus 340 is a knowledgebase that comprises IP and port information associated with numerous applications both non-malicious and malicious. Application identifier corpus 340 is updated by computer professionals so that other computer professionals may be aware an IP and port that applications utilize. Malicious activity identification engine 324 then searches malicious activity corpus 342 for "hot" attacks that are utilizing a same IP, port, and/or application. "Hot" attacks are attacks that are currently being experienced or have recently been experienced by corporations, enterprises, businesses, customers, or the like, and are being reported by security professionals. Malicious activity corpus 342 may include a knowledgebase that is updated by security professionals so that other security professionals may be aware of those malicious attacks that are currently being experienced or have recently been experienced in order that other security professionals may benefit from the information. Malicious activity corpus 342 may also include blogs, forum posts, social media, or the like, that is posted on social media concerning malicious attacks that are currently being experienced or have recently been experienced.

Malicious activity identification engine 324 then searches threat corpus 344 for threat intelligence associated with a same IP, port, application, and/or "hot" attack. Threat intelligence corpus 344 is a knowledgebase that is updated by security professionals so that other security professionals may be aware of intelligence associated with threats that are currently being experienced or have recently been experienced in order that other security professionals may benefit from the information, such as IP reputation, known attacks, vulnerabilities, or the like. Utilizing the gathered intelligence, i.e. the IP, port, application, "hot" attack, threat intelligence, or the like, intelligence, malicious activity identification engine 324 forms hypotheses of the incoming malicious attack, such as an application that is being targeted, an IP that is being used, a vulnerability that is being exploited, or the like. Utilizing the gathered information and the formed hypotheses, malicious activity identification engine 324 may identify one or more malicious attacks that are occurring.

For each malicious attack of the one or more malicious attacks, trap identification engine 326 searches trap corpus 346 for a malicious activity trap that matches the characteristics of the malicious attack. A malicious activity trap provides a secure computing area where the malicious activity may operate without harming the data processing system and be observed as discussed hereafter. That is, each trap in trap corpus 346 is catalogued by port, internet protocol, product emulated, vulnerabilities emulated, malicious attack name, application attacked, or the like. Thus, utilizing the characteristics of the incoming malicious attack, i.e. the IP, port, application, "hot" attack, threat intelligence, hypotheses, or the like, trap identification engine 326 identifies a trap for use in isolating the incoming malicious activity. It should be noted that not every malicious attack may have an explicit trap to isolate the malicious activity. Thus, trap identification engine 326 matches as many characteristics as possible and selects a trap with a highest amount of matching characteristic. If trap identification engine 326 is unable to match any characteristics, trap identification engine 326 may select a generic trap for using in isolating or at least slowing down the malicious activity. If trap identification engine 326 selects a generic trap since no explicit trap is identifiable, trap identification engine 326 sends a report to the security professionals so that the security professionals may build a new trap based on information gathered by monitoring engine 330 as will be discussed hereafter.

Whether or not an explicit trap or generic trap is selected for each detected malicious attack, network configuration engine 328 deploys the trap and automatically reconfigures the network such that the malicious activity is routed to the trap thereby isolating the malicious activity. Network configuration engine 328 deploys the trap and reconfigures the network based on a set of routing rules, such as routing rules, firewall rules, or the like. The set of routing rules is predefined such that, based on the trap selected by trap identification engine 326, network configuration engine 328 knows what network changes to implement, i.e. switches, routing, or the like, so that the malicious activity is routed to the isolated area. Similarly, if more than one of the one or more malicious attacks is being received over a common port, network configuration engine 328 spreads the traffic across all of the traps that are selected for that port utilizing sets of rules associated with each of the selected traps. The set of routing rules may also identify what type of monitoring is to be performed by monitoring engine 330, such that, when the malicious activity is routed to the isolated area, monitoring engine 330 observes the behavior of the malicious activity within each trap according to the set of routing rules.

Specifically, monitoring engine 330 observes the effectiveness of the trap in isolating the malicious activity and extracts features, such as a duration of a communication, an amount of transferred data, commands issued from the malicious activity, utilized communication details including IP addresses, sockets, ports, or the like, download web site addresses, test alive web pages, additionally downloaded code, malicious code files, additionally downloaded programs, or the like, for improving current traps or building new traps. That is, once the features of the isolation of the malicious activity are observed and gathered, update engine 332 stores the features as an update to threat intelligence corpus 344. Update engine 332 also utilizes the features to, automatically or in consultation with a security professional, improve one or more existing traps or build one or more new traps in trap corpus 346. That is, for each of the selected traps, update engine 332 utilizes the stored features to identify an effectiveness of the selected trap. When measuring the effectiveness, the determination may be that the selected trap needs minor changes or that the selected trap was not effective. Thus, for example, if the measured effectiveness of trap A is such that the trap A was ineffective, it does not make sense to make changes to the trap A but rather, update engine 332 marks, in the set of routing rules, that trap A was ineffective for malicious activity X and should not be used for malicious activity X in the future. However, since one or more traps may be selected, then if traps A, B, C, and D were selected for malicious activity X and trap A was marked as ineffective, but analysis of the features indicate that traps B, C, and D were effective, then update engine 332 may make changes traps B, C, and D as to be used for malicious activity X a next time malicious activity X comes in, i.e. the rule set will say "Route to trap B, C, and/or D". Determining whether a trap is effective may include, but is not limited to, connection abort or successful connection; duration of a successful connection (i.e. not aborted, no time out, packets flowing in and out); extracted number of IP addresses, URLs, files, commands, or the like; or any other countable measure that may be used to measure an effectiveness from activity to activity and trap to trap. A trap that encompasses characteristics associated with the most extracted features is considered a most effective trap for a particular malicious activity.

While the previous embodiment operates in reaction to detected incoming malicious activity, malicious activity response system 320 may also operate in a proactive manner. That is, in another illustrative embodiment, malicious activity identification engine 324 searches malicious activity corpus 342 for "hot" attacks that are currently being experienced by other corporations, enterprises, businesses, customers, or the like, and are being reported by security professionals even though cognitive system 300 is not experiencing current malicious attack. Again, malicious activity corpus 342 may include a knowledgebase that is updated by security professionals so that other security professionals may be aware of those malicious attacks that are currently being experienced or have recently been experienced in order that other security professionals may benefit from the information as well as blogs, forum posts, social media, or the like, that is posted on social media concerning malicious attacks that are currently being experienced or have recently been experienced.

Responsive to one or more "hot" attacks being identified, malicious activity identification engine 324 searches threat corpus 344 for threat intelligence associated with a same IP, port, and application associated with the identified one or more "hot" attacks. Again, threat intelligence corpus 344 is a knowledgebase that is updated by security professionals so that other security professionals may be aware of intelligence associated with threats that are currently being experienced or have recently been experienced in order that other security professionals may benefit from the information such as IP reputation, known attacks, vulnerabilities, or the like. Malicious activity identification engine 324 then forms hypotheses of the incoming malicious attack, such as an application that is being targeted, an IP that is being used, a vulnerability that is being exploited, or the like. Utilizing the gathered information and the formed hypotheses, malicious activity identification engine 324 may identify one or more malicious attacks that are occurring.

For each malicious attack of the one or more malicious attacks, trap identification engine 326 searches trap corpus 346 for a malicious activity trap that matches the characteristics of the malicious attack. A malicious activity trap provides a secure computing area where the malicious activity may operate without harming the data processing system and be observed as discussed hereafter. That is, each trap in trap corpus 346 is catalogued by port, internet protocol, product emulated, vulnerabilities emulated, malicious attack name, application attacked, or the like. Thus, utilizing the characteristics of the incoming malicious attack, i.e. the IP, port, application, "hot" attack, threat intelligence, hypotheses, or the like, trap identification engine 326 identifies a trap for use in isolating possible malicious activity. Network configuration engine 328 then deploys the trap and automatically reconfigures the network in preparations for possible incoming malicious activity. Network configuration engine 328 deploys the trap and reconfigures the network based on a set of routing rules, such as routing rules, firewall rules, or the like. The set of routing rules is predefined such that, based on the trap selected by trap identification engine 326, network configuration engine 328 knows what network changes to implement, i.e. switches, routing, or the like, so that the malicious activity is routed to the isolated area. Similarly, if malicious activity is then detected and identified as malicious activity as associated with one or the one or more identified "hot" attacks, network configuration engine 328 routes the malicious activity to the already deployed trap and the operation proceeds as discussed previously.

Thus, the illustrative embodiments provide mechanisms for implementing a malicious activity response system that automatically identifies and handles malicious activities within a data processing system. The mechanisms observe network activities and automatically configure a trap environment based on information like IP address, port information, protocols, or the like, identified using cognitive and anomaly detecting mechanisms as well as based on information gained from resources such as, for example, Watson for CyberSecurity, web or social media data, X-Force Threat intelligence information, or the like. The mechanisms route unknown and known malicious activities to multiple generic and specific malicious activity traps and compare the observed activities on each trap to identify the most attracting trap method based on the harvested data of each trap. The mechanism store all gather information in order to learn which identification methods, resources, traps, or the like are most effective. By automatically deploying generic and/or specific trap environments at substantially a same time that the malicious activities are identified the time required to gain insights into malicious activities is decreased from days and weeks to hours, minutes, or even seconds and allows for early protection and threat intelligence usage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
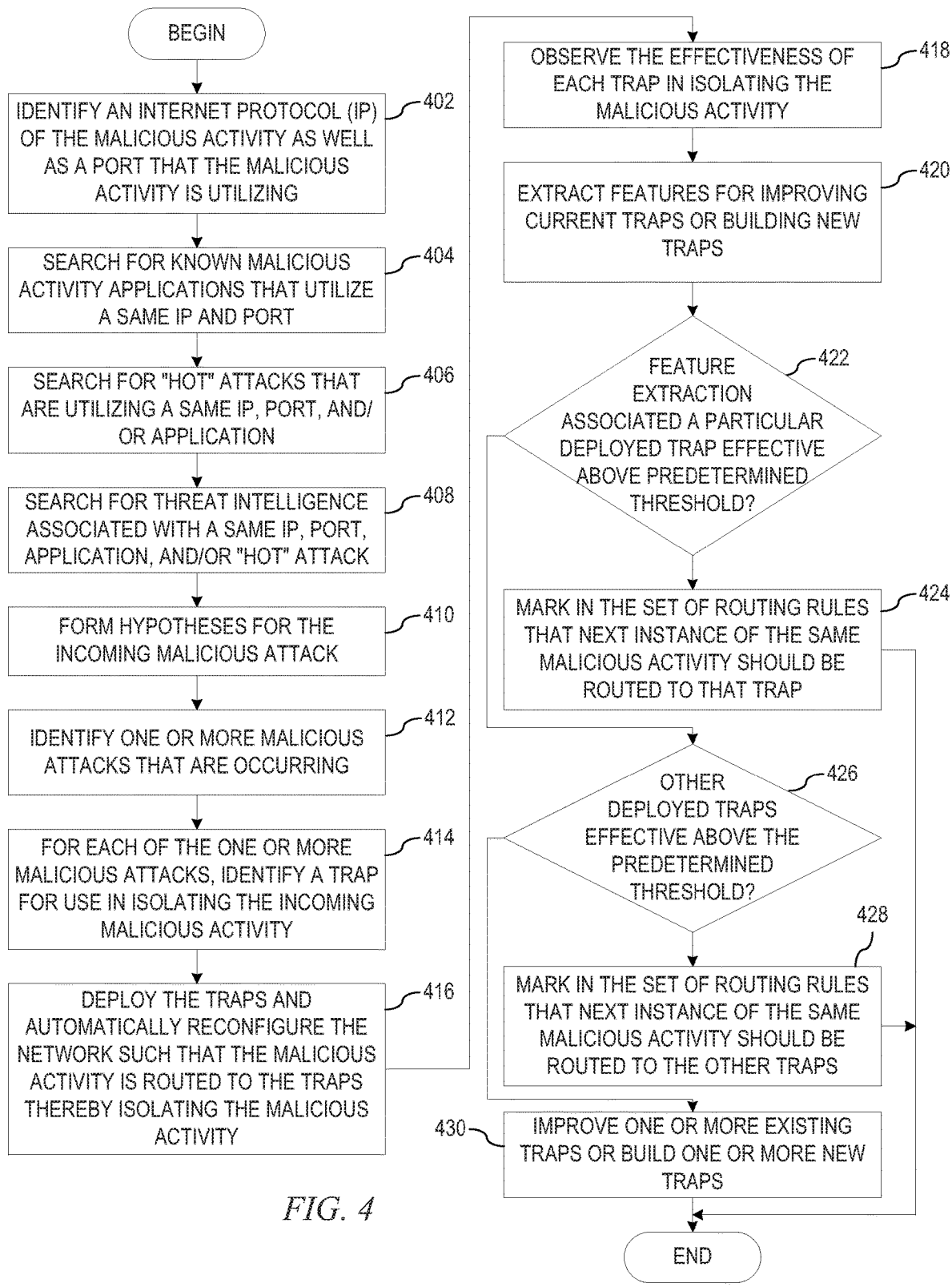
FIG. 4 depicts an exemplary flowchart of the operation performed by a cognitive system in implementing a malicious activity response system that automatically identifies and handles malicious activities within a data processing system in accordance with an illustrative embodiment.

FIG. 4 depicts an exemplary flowchart of the operation performed by a cognitive system in implementing a malicious activity response system that automatically identifies and handles malicious activities within a data processing system in accordance with an illustrative embodiment. As the operation begins, responsive to receiving an indication that of malicious activity, the malicious activity response system identifies an internet protocol (IP) of the malicious activity as well as a port that the malicious activity is utilizing (step 402). Utilizing the identified IP and port, the malicious activity response system searches for known malicious activity applications that utilize a same IP and port (step 404). The malicious activity response system then searches for "hot" attacks that are utilizing a same IP, port, and/or application (step 406).

The malicious activity response system then searches for threat intelligence associated with a same IP, port, application, and/or "hot" attack (step 408). Utilizing the gathered intelligence, i.e. the IP, port, application, "hot" attack, threat intelligence, or the like, intelligence, the malicious activity response system forms hypotheses for the incoming malicious attack (step 410), such as an application that is being targeted, an IP that is being used, a vulnerability that is being exploited, or the like. Utilizing the gathered information and the formed hypotheses, the malicious activity response system identifies one or more malicious attacks that are occurring (step 412).

For each malicious attack of the one or more malicious attacks, the malicious activity response system identifies a trap for use in isolating the incoming malicious activity (step 414). The malicious activity response system deploys the trap and automatically reconfigures the network such that the malicious activity is routed to the trap thereby isolating the malicious activity (step 416). The malicious activity response system observes the behavior of the malicious activity within each trap (step 418). Specifically, the malicious activity response system observes the effectiveness of the trap in isolating the malicious activity and extracts features, such as a duration of a communication, an amount of transferred data, commands issued from the malicious activity, utilized communication details including IP addresses, sockets, ports, or the like, download web site addresses, test alive web pages, additionally downloaded code, malicious code files, additionally downloaded programs, or the like, for improving the set of routing rules for a malicious attack to the best available trap and/or improving current traps or building new traps (step 420). That is, once the features of the isolation of the malicious activity are observed and gathered, the malicious activity response system utilizes the features to determine whether feature extraction associated a particular deployed trap was effective above a predetermined threshold (step 422).

If at step 422 the malicious activity response system determines that the feature extraction associated a particular deployed trap was effective above a predetermined threshold, the malicious activity response system marks in the set of routing rules associated with the particular trap that, with a next instance of the same malicious activity occurring, the malicious activity should be routed to that trap (step 424). However, if at step 422 the malicious activity response system determines that the feature extraction associated the particular deployed trap was ineffective above the predetermined threshold, the malicious activity response system determines whether any of the deployed traps were effective above the predetermined threshold (step 426), with the operation ending thereafter. If at step 426 the malicious activity response system determines that at least one other trap that was effective above the predetermined threshold, then the malicious activity response system updates the set of routing rules associated with that trap to indicate that, with a next instance of the same malicious activity occurring, the malicious activity should be routed to that trap (step 428), with the operation ending thereafter. If step 426 the malicious activity response system determines that no other trap that was effective above the predetermined threshold, the malicious activity response system improves one or more existing traps or build one or more new traps (step 430), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for automatically identifying and handling malicious activities within a data processing system. The mechanisms observe network activities and automatically configure a trap. The mechanisms route unknown and known malicious activities to multiple generic and specific malicious activity traps and compare the observed activities on each trap to identify the most attracting trap method based on the harvested data of each trap. The mechanism store all gather information in order to learn which identification methods, resources, traps, or the like are most effective.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to cause the processor to be configured to implement a malicious activity response system that automatically identifies and handles malicious activities within the data processing system, the method comprising:
    identifying a trap for use in isolating a malicious activity associated with a malicious attack;
    deploying the trap and automatically reconfiguring a network associated with the data processing system such that the malicious activity is routed to the trap thereby isolating the malicious activity;
    observing a behavior of the malicious activity within the trap;
    extracting features associated with the malicious activity in the trap; and
    utilizing the extracted features to handle a future malicious activity, wherein the handling of the future malicious activity comprises building a new trap and wherein building the new trap comprises:
    comparing the extracted features to an existing trap in a set of existing traps; and
    responsive to identifying a difference in the extracted features from features of the existing trap, building the new trap to include the features of the existing trap and to address the extracted features.

2. The method of claim 1, wherein the handling of the future malicious activity further comprises one or more of adjusting a set of routing rules to improve trap routing when a similar malicious activity occurs or improving an existing trap.

3. The method of claim 1, wherein the features extracted from a malicious activity in each trap comprise one or more of a duration of a communication, an amount of transferred data, commands issued from the malicious activity, utilized communication details including IP addresses, sockets, and ports, download web site addresses, test alive web pages, additionally downloaded code, malicious code files, or additionally downloaded programs.

4. The method of claim 2, wherein improving the existing trap comprises:
    comparing the extracted features to the existing trap in a set of existing traps; and
    responsive to identifying a difference in the extracted features from the features of the existing trap, reconfiguring the existing trap to address the extracted features and thereby increase the effectiveness of the existing trap.

5. The method of claim 1, wherein operations are performed in response to identifying one or more of an access that utilizes an unused port of the data processing system, a new pattern of data, data patterns matching a previously encountered malicious attack, or data patterns similar to a previously encountered malicious attack based on characteristics associated with the malicious activity and wherein the characteristics associated with the malicious activity comprise one or more of an Internet Protocol (IP), port, application, or "hot" attack identification.

6. The method of claim 1, wherein operations are performed in response to identifying a "hot" attack being experienced by another data processing system and before an access associated with the malicious activity is observed on the data processing system.

7. The method of claim 1, wherein a hypothesis is formed for the malicious attack to identify the malicious attack that is occurring by cognitively forming the hypothesis utilizing the treat intelligence associated with characteristics of the malicious activity.

8. A computer program product comprising a computer readable storage medium having a computer readable program stored therein, wherein the computer readable program, when executed on a data processing system, causes the data processing system to implement a malicious activity response system that automatically identifies and handles malicious activities within the data processing system, and further causes the data processing system to:
- identify a trap for use in isolating a malicious activity associated with a malicious attack;
- deploy the trap and automatically reconfiguring a network associated with the data processing system such that the malicious activity is routed to the trap thereby isolating the malicious activity;
- observe a behavior of the malicious activity within the trap;
- extract features associated with the malicious activity in the trap; and
- utilize the extracted features to handle a future malicious activity, wherein the handling of the future malicious activity comprises building a new trap and wherein the computer readable program to build the new trap, when executed on the data processing system, further causes the data processing system to:
- compare the extracted features to an existing trap in a set of existing traps; and
- responsive to identifying a difference in the extracted features from features of the existing trap, build the new trap to include the features of the existing trap and to address the extracted features.

9. The computer program product of claim 8, wherein the handling of the future malicious activity further comprises one or more of adjusting a set of routing rules to improve trap routing when a similar malicious activity occurs or improving an existing trap.

10. The computer program product of claim 9, wherein the computer readable program to improve the existing trap, when executed on the data processing system, further causes the data processing system to:
- compare the extracted features to the existing trap in the set of existing traps; and
- responsive to identifying a difference in the extracted features from the features of the existing trap, reconfigure the existing trap to address the extracted features and thereby increase the effectiveness of the existing trap.

11. The computer program product of claim 8, wherein the data processing system executes the computer readable program in response to identifying one or more of an access that utilizes an unused port of the data processing system, a new pattern of data, data patterns matching a previously encountered malicious attack, or data patterns similar to a previously encountered malicious attack based on characteristics associated with the malicious activity and wherein the characteristics associated with the malicious activity comprise one or more of an Internet Protocol (IP), port, application, or "hot" attack identification.

12. The computer program product of claim 8, wherein the data processing system executes the computer readable program in response to identifying a "hot" attack being experienced by another data processing system and before an access associated with the malicious activity is observed on the data processing system.

13. An apparatus comprising:
a processor; and
a memory coupled to the processor, wherein the memory comprises instructions which, when executed by the processor, cause the processor to implement a malicious activity response system that automatically identifies and handles malicious activities within the data processing system, and further causes the processor to:
- identify a trap for use in isolating a malicious activity associated with a malicious attack;
- deploy the trap and automatically reconfiguring a network associated with the data processing system such that the malicious activity is routed to the trap thereby isolating the malicious activity;
- observe a behavior of the malicious activity within the trap;
- extract features associated with the malicious activity in the trap; and
- utilize the extracted features to handle a future malicious activity, wherein the handling of the future malicious activity comprises building a new trap and wherein the instructions to build the new trap, when executed by the at least one processor, further causes the at least one processor to:
- compare the extracted features to an existing trap in a set of existing traps; and
- responsive to identifying a difference in the extracted features from features of the existing trap, build the new trap to include the features of the existing trap and to address the extracted features.

14. The apparatus of claim 13, wherein the handling of the future malicious activity further comprises one or more of adjusting a set of routing rules to improve trap routing when a similar malicious activity occurs or improving an existing trap.

15. The apparatus of claim 14, wherein the instructions to improve the existing trap, when executed by the at least one processor, further cause the at least one processor to:
- compare the extracted features to the existing trap in the set of existing traps; and
- responsive to identifying a difference in the extracted features from the features of the existing trap, reconfigure the existing trap to address the extracted features and thereby increase the effectiveness of the existing trap.

16. The apparatus of claim 13, wherein the at least one processor executes the instructions in response to identifying one or more of an access that utilizes an unused port of the data processing system, a new pattern of data, data patterns matching a previously encountered malicious attack, or data patterns similar to a previously encountered malicious attack based on characteristics associated with the malicious activity and wherein the characteristics associated with the malicious activity comprise one or more of an Internet Protocol (IP), port, application, or "hot" attack identification.

17. The apparatus of claim 13, wherein the at least one processor executes the instructions in response to identifying a "hot" attack being experienced by another data processing system and before an access associated with the malicious activity is observed on the data processing system.

* * * * *